(12) United States Patent
Becker et al.

(10) Patent No.: US 7,733,544 B2
(45) Date of Patent: *Jun. 8, 2010

(54) LASER SCANNER

(75) Inventors: Reinhard Becker, Ludwigsburg (DE);
Bernd-Dietmar Becker, Ludwigsburg (DE)

(73) Assignee: Faro Technologies, Inc., Lake Mary, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/194,858

(22) Filed: Aug. 20, 2008

(65) Prior Publication Data

US 2009/0147319 A1 Jun. 11, 2009

Related U.S. Application Data

(63) Continuation of application No. 10/854,319, filed on May 26, 2004, now Pat. No. 7,430,068.

(30) Foreign Application Priority Data

Dec. 29, 2003 (DE) ................................ 203 20 216

(51) Int. Cl.
*H04N 1/46* (2006.01)
*H04N 1/04* (2006.01)
(52) U.S. Cl. .................... 358/511; 358/505; 358/474

(58) Field of Classification Search ................. 358/511, 358/505, 474, 475; 356/359, 360
See application file for complete search history.

(56) References Cited

U.S. PATENT DOCUMENTS

| 6,069,700 | A * | 5/2000 | Rudnick et al. ............. 356/511 |
| 2006/0109536 | A1* | 5/2006 | Mettenleiter et al. ........ 359/196 |
| 2006/0245717 | A1* | 11/2006 | Ossig et al. ................. 385/147 |

OTHER PUBLICATIONS iQsun Laserscanner Brochure, 2 pages, Apr. 2005.

* cited by examiner

*Primary Examiner*—Houshang Safaipour
(74) *Attorney, Agent, or Firm*—Cantor Colburn LLP

(57) ABSTRACT

A laser scanner may include a measuring head structured to be rotatable around a first axis, a first rotary drive structured to rotate the measuring head, a rotary mirror rotatable around a second axis, a second rotary drive structured to rotate the rotary mirror, a transmitter structured to transmit a light beam, a receiver structured to receive a reflection of the light beam from an object located at a distance from the laser scanner, and a processor structured to process signals embedded within the reflection of the light beam. The measuring head may include a plurality of modules, and the first rotary drive, rotary mirror, second rotary drive, transmitter, and receiver may be provided on one of the plurality of modules. At least two of the plurality of modules may be releasably connected to each other.

16 Claims, 2 Drawing Sheets

LASER SCANNER

CROSS REFERENCE TO RELATED APPLICATIONS

The present application is a continuation application of U.S. patent application Ser. No. 10/854,319 filed May 26, 2004, the entire contents of which are incorporated herein by reference and priority to which is claimed herein. The application Ser. No. 10/854,319 claimed benefit of the date of the earlier filed German Patent Application No. 203 20 216.3 filed Dec. 29, 2003, which is incorporated herein by reference, and priority to which is claimed herein.

FIELD OF THE INVENTION

The present invention relates to the field of 3D laser scanners.

BACKGROUND OF THE INVENTION

Laser scanners of the type specified above are commercially available, e.g. under the trade name "iQsun 625" from the assignee of the present application.

Laser scanners can be used for scanning closed or open spaces like interior spaces of buildings, industrial installations, tunnels and the like. The rotary mirror, rotating at high speed about a horizontal axis, generates a fan of light beams in a vertical plane. This fan of light beams, in one type of 3D laser scanners, is in turn rotated about a vertical axis through the entire surrounding space with a much slower rotational speed. In other types of 3D laser scanners the fan of light beams is not rotated but displaced along a given trajectory, for example on board of a wagon moving through a tunnel.

The light reflected by objects within the space surrounding the laser scanner is received by the laser scanner and is processed. When doing so, the reflectivity as well as the distance for any measured point is determined. Seen as a whole, the laser scanner thereby generates a true 3D image of the space surrounding the laser scanner with 360.degree. spatial angle under ideal conditions or along a given trajectory.

Such laser scanners are relatively complicated and sophisticated instruments and, hence, accordingly expensive. On the other hand, in practice such laser scanners are distinctly configured for distinct operational and measuring requirements, wherein the decisive criteria are the precision of the measuring results, the spatial measuring range and, finally, the particular rotating mirror design.

If a user, for cost reasons, makes a decision for a specific type of a laser scanner being in the lower range of these criteria, then he/she is bound to this class of specifications. This means that the user, in case that at a later stage a scanner of a higher class of specifications is required, and the user is willing to make an accordingly higher investment, an entirely new instrument must be purchased even if the higher requirements concern only a few of the laser scanner components.

Moreover, in case of a malfunction of the laser scanner, the entire instrument is down and must be serviced. Considering that there exist only a few specialized manufacturers of such laser scanners worldwide, such service or repair may require shipping the instrument over long distances.

It shall become possible to provide a laser scanner with which a user may step from one class of specifications to another class without the necessity to purchase an entirely new instrument. Further, it shall be possible to reduce the down time of a defective laser scanner to a minimum.

SUMMARY OF THE INVENTION

An embodiment of a laser scanner may include a measuring head structured to be rotatable around a first axis, a first rotary drive structured to rotate the measuring head, a rotary mirror rotatable around a second axis, a second rotary drive structured to rotate the rotary mirror, a transmitter structured to transmit a light beam, a receiver structured to receive a reflection of the light beam from an object located at a distance from the laser scanner, and a processor structured to process signals embedded within the reflection of the light beam. The measuring head may include a plurality of modules, and the first rotary drive, rotary mirror, second rotary drive, transmitter, and receiver may be provided on one of the plurality of modules. At least two of the plurality of modules may be releasably connected to each other.

An embodiment of a laser scanner system may include a rotary unit module that includes a rotor that is rotatable around an axis, a rotary drive module structured to rotate the rotor around the first axis, a light transmitter module structured to transmit a light beam to an object located a distance from the laser scanner, a receiver module structured to receive a reflection of the light beam from the object, and a process module structured to process information from the reflection of the light beam. At least one of the rotary drive module, light transmitter module, receiver module, and processor module are releasably connected to the rotary unit module.

A method of modifying operation specification of a laser measuring system may include providing a laser scanner that includes a plurality of modules and replacing a first module of the plurality of modules with a replacement module. Properties of at least the first module may affect the operational specification of the laser measuring system, and the first module may be releasably connected to at least another of the plurality of modules. Properties of the replacement module may be different from properties of the first module, such that the operation specifications of the laser measuring system are changed by replacing the first module with the replacement module.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Figure 1:
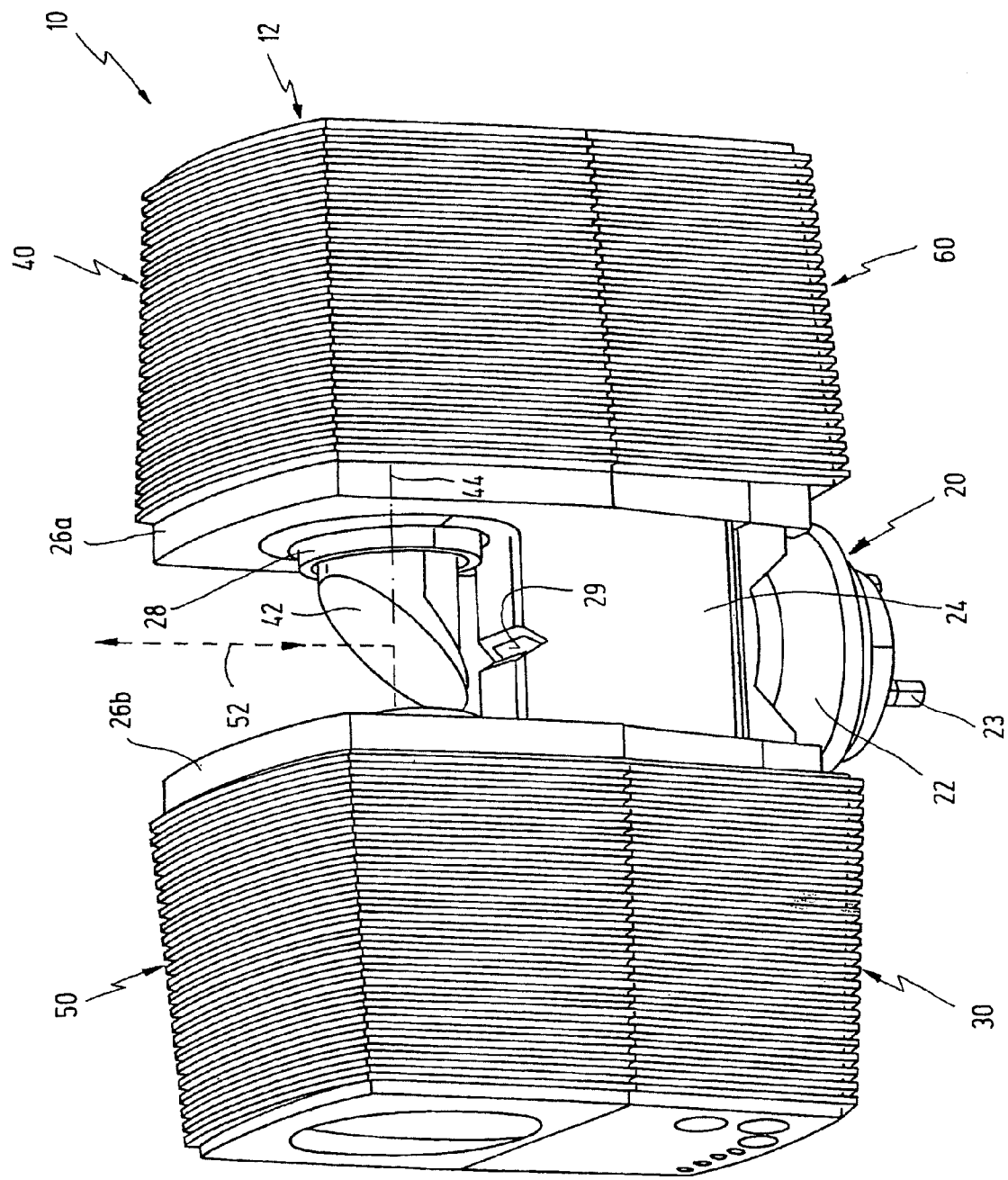
FIG. 1 shows a perspective view, from above, of a laser scanner according to at least an embodiment of the present invention.

In the figures, reference numeral 10 as a whole denotes a laser scanner having a measuring head 12 conventionally arranged e.g. on a tripod (not shown). The measuring head 12 consists of five modules 20, 30, 40, 50 and 60.

Figure 2:
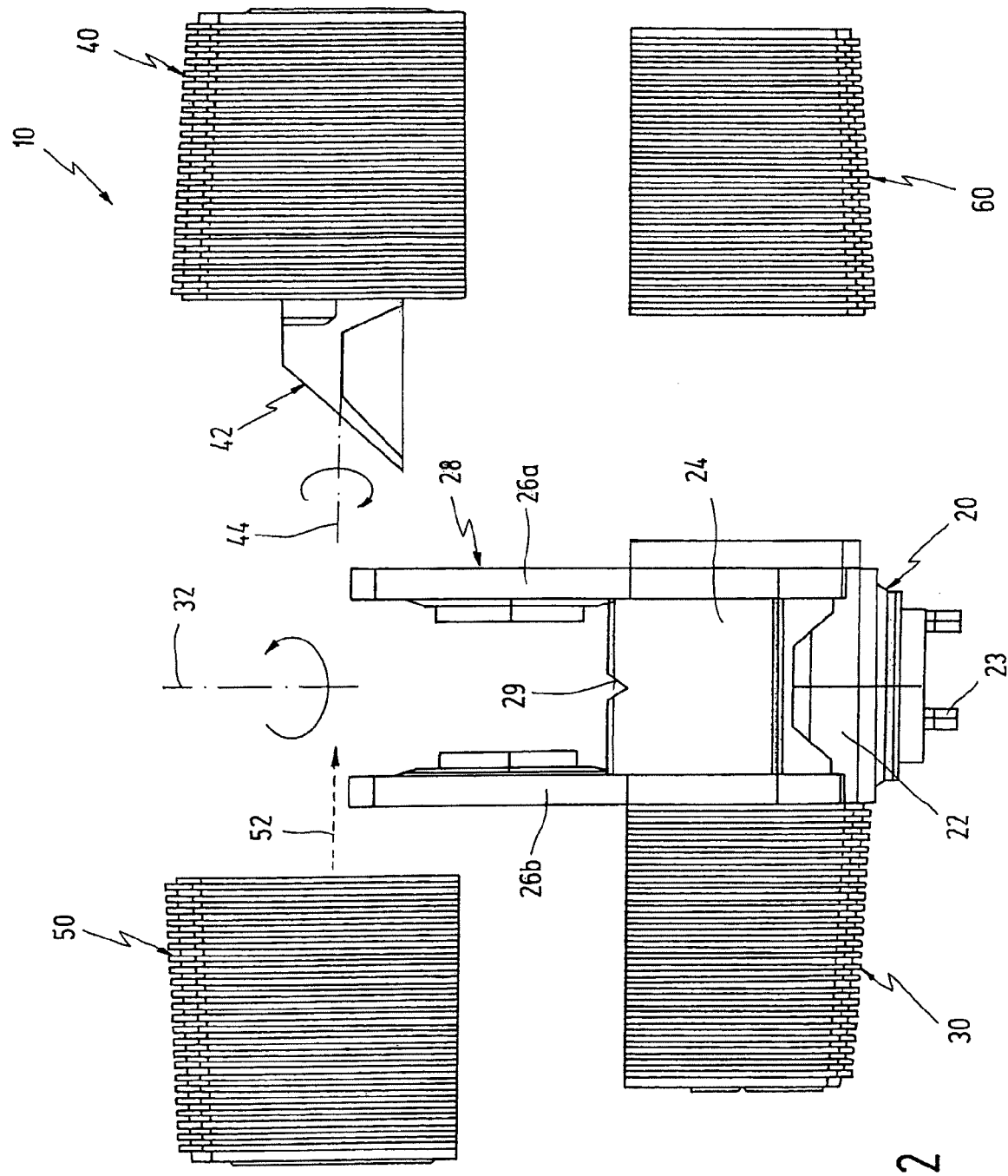
FIG. 2 shows the laser scanner of FIG. 1 in an exploded view.

A first module 20 is a rotary unit. First module 20 houses a base 22 held stationary under normal operational conditions. Base 22 has standardized pegs 23 or vertically adjustable feet as well as a bubble level (not shown). Standardized pegs 23 may be adapted to commercially available tripods to enable an easy click-connection with laser scanner 10. A rotor 24 is located on base 22. Rotor 24 has lateral legs 26a, 26b preferably integral with its support structure. Legs 26a, 26b extend parallel, vertical and at a distance from each other. Right hand leg 26b in FIGS. 1 and 2 has a through-opening 28 for a rotary mirror, as will be explained below. A reference mark 29 configured as a notch is provided in the central range of rotor 24 bridging legs 26a and 26b.

A second module 30 is connected to rotor 24 in the left and lower area of measuring head 12. Second module 30 houses a first drive motor as well as an inclination sensor. The motor is used for rotating rotor 24 about a vertical axis 32 relatively to base 22. This rotation is effected at relatively low rotational speed.

A third module 40 is connected to the exterior surface of right hand leg 26b in an upper area thereof. Third module 40 houses a light transmitter as well as the rotary mirror 42 mentioned above. Rotary mirror 42 extends through through-opening 28 within leg 26b. Third module 40, moreover, comprises a further drive motor for rotary mirror 42 for rotating same about a horizontal axis 44 at a very high rotational speed.

A fourth module 50 is connected to the exterior surface of left hand leg 26a of rotor 24 in an upper area thereof. Fourth module 50 houses a receiver having a range finder. According to the specific design, fourth module 50 instead of third module 40 may also comprise the light transmitter. Reference numeral 52 in FIG. 1 denotes such a light beam which, in any event is received as a light beam reflected from objects to be scanned in the space surrounding laser scanner 10. Incoming light beam 52 is reflected by rotary mirror 42 and is guided along horizontal axis 44 to the receiver comprised in fourth module 50.

A fifth module 60 is laterally connected to rotor 24 at a lower area thereof. Fifth module 60 houses a computer or any other data processor and, preferably a control panel.

As may be seen from the figures, an extremely compact assembly is thus achieved in which the individual modules may be combined by simply plugging same together. The required mechanical connections are preferably made by form-fitting openings or pegs, respectively, whereas the required electrical connections are preferably made by appropriate electrical connectors and a CAN bus.

It goes without saying that the distribution of the various functions as explained above in connection with the illustrated embodiment is just an example as is also the number of modules. In particular, it is possible to distribute the functions otherwise as already explained with respect to the light transmitter. Further, the modules may in turn be divided into sub-modules, and some modules may also be structurally combined as for example first module 20 and second module 30 which may be structurally integrated into one common base and drive module.

With a laser scanner according to at least an embodiment of the present invention, a user may, namely, in the first place purchase a model in which the various components are in the lowermost range of specifications such that the purchase price is relatively low. When the requirements of the user develop positively, for example in that a higher spatial measuring range or, alternately, a higher mechanical or electronic quality and, concurrently a higher precision of the measurement is required, then the user may make a decision to replace only some of the scanner modules, while other modules may still continue to be used. It is, thus, possible to upgrade the scanner into a higher class of specifications at lower costs as compared to conventional laser scanners where an upgrade necessitated the purchase of an entirely new instrument.

Of course, for a user owning a wide selection of modules of a laser scanner, it is possible to assemble a specific combination of modules for a specific measuring task. For example, if there are only moderate requirements for a specific measuring task, then the laser scanner may be equipped with modules from the lowermost range only such that in case of a measurement to be performed under rough external conditions bearing the risk of a damage during the measurement, only the less expensive modules are exposed to the risk of damage. The user may restrict the use of the most expensive and high-quality modules to applications with the highest requirements e.g. to the spatial measuring range and the precision of measuring results. Under such special circumstances, specific provisions may be taken to avoid damage to such highly expensive modules.

Finally, servicing is simplified. If, namely, only one specific module of a laser scanner fails, then only that particular module needs to be replaced which may be effected quickly and at tolerable costs through courier services. This is of particular advantage when there is a long geographical distance between the customer and the manufacturer. In that case the module exchange may be effected within a short period of time.

Another advantage of at least an embodiment of the laser scanner is that the user may under certain circumstances combine modules of different manufacturers, thus also increasing the flexibility on the user's side.

Finally, an embodiment of the laser scanner enables the user to start with a basic version with the required minimum number of components or modules, and then to continue with an extended version in which further functions are implemented into the laser scanner, for example a fully integrated processing and display of the measuring results.

Under normal operational conditions of the laser scanner the first axis preferably extends vertically and the second axis extends horizontally.

At least an embodiment of the first rotary drive comprises a base, a rotor rotatable relative to the base, and a drive motor for rotating the rotor, the base together with the rotor being comprised within the first module and the drive motor being comprised within the second module. The first module is preferably arranged centrally and at a lower side of the measuring head, the second module being arranged laterally and likewise at the lower side of the measuring head.

Under normal operational conditions of the laser scanner the base is held stationary.

This measure has the advantage that also with respect to the drive components a modular design is made such that different drive motors for driving the rotor may be used or different rotors for the same drive motor. Positioning these modules at the underside of the measuring head has the advantage that these modules are not an obstacle.

In a preferred modification of this embodiment the rotor has at least one leg with at least one further module being adapted to be attached thereto. The at least one leg is preferably configured integral with the rotor and there may be two legs extending parallel to each other and parallel to the first axis.

These measures have the advantage that the various modules may easily be assembled together, the first module being the base module. The legs may be configured such as to allow a mechanical and/or an electrical interconnection between the modules by simple plugging. The integral design has the advantage that a high mechanical stability is achieved so that the individual modules may be oriented exactly with respect to each other.

It is, further, preferred when the legs delimit a gap between them, in particular when the gap is dimensioned such as to receive the rotary mirror.

This measure has the advantage that almost the entire rotational angle of 360.degree. may be utilized during rotation of the rotary mirror about its horizontal axis. Only in the area bridging the two legs there is a small shading angle, limiting the measuring range.

Insofar, it is further preferred if an optical reference mark is situated within the rotor between the legs.

This measure has the advantage that the mechanical bridge between the legs is utilized to generate a predetermined mark in space that can be used for calibrating purposes.

In at least another embodiment, the base has standardized pegs, adjustable feet and a bubble level, and the second module may, further, comprise an inclination sensor.

These measures have the advantage that the laser scanner may be reliably installed and calibrated at the measurement site, such that the two axes are oriented exactly vertically and horizontally, respectively.

In at least another embodiment, the third module is arranged laterally and at an upper side of the measuring head, wherein the rotor preferably has two legs extending parallel to each other and parallel to the first axis, the third module being attached to one of the legs, and wherein the rotary mirror may extend through a form-fitting opening within the leg.

These measures have the advantage that the rotary mirror with its second rotary drive may be arranged simply and precisely on the measuring head, wherein the lateral positioning at the upper side of the measuring head yields the maximum possible freedom for the measuring beam. The arrangement of the rotary mirror within a form-fitting opening in the leg has the further advantage that the rotary mirror axis may be adjusted precisely relative to the other modules.

In at least another embodiment, the receiver is comprised within a fourth module, the fourth module being arranged laterally and at an upper side of the measuring head, the receiver preferably comprising a range finder.

This measure has the advantage that the receiver is positioned at an optimum and mechanically stable position.

In at least an embodiment, the transmitter is comprised within the third module.

This measure has the advantage that a most compact design is possible with the rotary mirror, its associated rotary drive and the transmitter all integrated into the third module.

In at least another embodiment, the computer is comprised within a fifth module, wherein the computer may comprise a control panel. Preferably, the fifth module is arranged laterally and at a lower side of the measuring head. The third and the fourth module on the one hand and the second and the fifth module on the other hand may be arranged on opposite sides of the first module.

Seen as a whole, a configuration is achieved in which the first module is located in the centre of the measuring head with the third and the fourth modules on opposite lateral sides thereof above and the second and fifth modules on opposite lateral sides thereof below. This results in an extremely compact and technically suitable configuration.

It is preferred when the first and the third modules, the first and the fourth modules, and the first and the fifth modules are mechanically interconnected by means of form fitting mechanical connectors. Further, the first and the second modules may be configured integral with each other.

These measures have the advantage that a most reliable mechanical assembly of the modules is achieved, nevertheless allowing a quick disassembly thereof after use.

The first and/or the second and/or the third and/or the fourth and/or the fifth modules are preferably electrically interconnected by means of a CAN bus.

This measure has the advantage that all modules or any given sub-combination of modules may interact electronically, wherein the interconnection of the modules involved may simply be effected by plugging.

Further advantages will become apparent from the description and the enclosed drawing.

It goes without saying that the features mentioned above and those that will be explained hereinafter may not only be used in the particular given combination but also in other combinations or alone without departing from the scope of the present invention.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A laser scanner comprising:
    a measuring head structured to be rotatable around a first axis, the measuring head comprising a plurality of modules;
    a first rotary drive structured to rotate the measuring head, the first rotary drive being provided on at least one of the plurality of modules;
    a rotary mirror rotatable around a second axis, the rotary mirror provided on one of the plurality of modules;
    a second rotary drive structured to rotate the rotary mirror, the second rotary drive being provided on one of the plurality of modules;
    a transmitter structured to transmit a light beam, the transmitter being provided on one of the plurality of modules;
    a receiver structured to receive a reflection of the light beam from an object located at a distance from the laser scanner, the receiver being provided on one of the plurality of modules; and
    a processor structured to process signals embedded within the reflection of the light beam, the processor being provided on one of the plurality of modules;
    wherein at least two of the plurality of modules are releasably connected to each other.

2. The laser scanner of claim 1, wherein the first rotary drive comprises a base, a rotor rotatable relative to the base, and a drive motor for rotating the rotor, the base together with the rotor being comprised within a first module of the plurality of modules and the drive motor being comprised within a second module of the plurality of modules.

3. The laser scanner of claim 1, wherein the rotor has at least one leg with at least one further module being adapted to be attached thereto.

4. The laser scanner of claim 3, wherein the leg is configured integral with the rotor.

5. The laser scanner of claim 3, wherein the rotor has two legs, the legs extending parallel to each other and parallel to the first axis.

6. The laser scanner of claim 5, wherein the legs delimit a gap between them.

7. The laser scanner of claim 6, wherein the gap is dimensioned such as to receive the rotary mirror.

8. The laser scanner of claim 6, wherein an optical reference mark is situated within the rotor between the legs.

9. The laser scanner of claim 1, wherein the base has standardized pegs, adjustable feet and a bubble level.

10. The laser scanner of claim 1, wherein the second module, further, comprises an inclination sensor.

11. The laser scanner of claim 5, wherein the rotor has two legs, the legs extending parallel to each other and parallel to the first axis.

12. The laser scanner of claim 11, wherein the rotary mirror extends through a form-fitting opening within the leg.

13. The laser scanner of claim 1, wherein the receiver comprises a range finder.

14. The laser scanner of claim 1, wherein at least two modules of the plurality of modules are electrically interconnected by means of a CAN bus.

15. A laser scanner system comprising:
- a rotary unit module comprising a rotor that is rotatable around an axis;
- a rotary drive module structured to rotate the rotor around the first axis;
- a light transmitter module structured to transmit a light beam to an object located at a distance from the laser scanner;
- a receiver module structured to receive a reflection of the light beam from the object; and
- a processor module structured to process information from the reflection of the light beam;
- wherein at least one of the rotary drive module, light transmitter module, receiver module, and processor module are releasably connected to the rotary unit module.

16. A method of modifying operational specifications of a laser measuring system, the method comprising:
- providing a laser scanner comprising:
  - a plurality of modules;
  - wherein properties of at least a first module of the plurality of modules affect the operational specification of the laser measuring system; and
  - the first module is releasably connected to at least another of the plurality of modules; and
- replacing the first module with a replacement module;
- wherein properties of the replacement module are different from the properties of the first module, such that the operational specifications of the laser measuring system are changed by replacing the first module with the replacement module.

* * * * *